US007245727B2

(12) United States Patent
Cresci et al.

(10) Patent No.: US 7,245,727 B2
(45) Date of Patent: Jul. 17, 2007

(54) REMOTE CONTROLLED AUDIO MIXING CONSOLE

(76) Inventors: Jonathan Cresci, 1302 Malbay Dr., Lutherville, MD (US) 21093; Jared Weissbrot, 585 Goodale Hill Rd., Glastonbury, CT (US) 06033

( * ) Notice: Subject to any disclaimer, the term of this patent is extended or adjusted under 35 U.S.C. 154(b) by 579 days.

(21) Appl. No.: 10/262,230

(22) Filed: Sep. 30, 2002

(65) Prior Publication Data

US 2003/0063760 A1 Apr. 3, 2003

Related U.S. Application Data

(60) Provisional application No. 60/326,113, filed on Sep. 28, 2001.

(51) Int. Cl.
*H04B 1/00* (2006.01)

(52) U.S. Cl. ...................................... 381/119; 709/217

(58) Field of Classification Search ............... 381/119, 381/103; 338/13; 323/354; 709/217, 218
See application file for complete search history.

(56) References Cited

U.S. PATENT DOCUMENTS

| | | | | |
|---|---|---|---|---|
| 5,892,938 | A * | 4/1999 | Eastty et al. | 710/8 |
| 6,239,655 | B1 * | 5/2001 | Orozov et al. | 330/86 |
| 6,658,232 | B1 * | 12/2003 | Johnson | 455/3.06 |
| 2002/0124100 | A1 * | 9/2002 | Adams | 709/232 |

* cited by examiner

*Primary Examiner*—Vivian Chin
*Assistant Examiner*—Con P. Tran
(74) *Attorney, Agent, or Firm*—Dickstein, Shapiro, LLP.

(57) ABSTRACT

An analog audio mixing console is controlled over a standard TCP/IP connection using a HTTP session between a remote device, such as a personal digital assistant, and a networking circuit board installed in the audio mixing device enabling the audio mixing console to function as a HTTP server. The networking circuit board is programmed to accept programming statements, for example, JAVA commands and the audio mixing console is accessible and fully functional via the remote device.

15 Claims, 13 Drawing Sheets

REMOTE CONTROLLED AUDIO MIXING CONSOLE

CROSS-REFERENCE TO RELATED APPLICATION

This application is based upon and claims priority to U.S. provisional patent application Ser. No. 60/326,113 filed Sep. 28, 2001 and entitled SYSTEM AND METHOD FOR REMOTE CONTROL OF AUDIO MIXER, the entire contents of which are hereby incorporated by reference.

FIELD OF THE INVENTION

The present invention relates generally to a remote control audio mixing console, and more particularly to remotely controlling an audio mixing console via a simple Internet connection.

BACKGROUND OF THE INVENTION

Audio equipment, for example home stereo system equipment and professional recording consoles, includes controls for manipulating audio effects, including, for example, panning, busing, volume and equalization. As used herein, panning refers to manipulating the balance of an audio signal, for example, from a left channel to a right channel. Volume control, as used herein, generally refers to the ability to increase and decrease the level of an audio signal. Also as used herein, equalization generally means manipulating various frequency ranges of an audio signal. Many more audio effects, including, for example, reverb, digital delay and the like are well known in the art and included in audio equipment.

Audio engineers operate prior art mixing consoles by controlling, for example, a series of switches, sliders, knobs and buttons in order to invoke potentiometers and switches that implement desired audio effects. Prior art mixing console are essentially closed systems, requiring audio technicians to monitor and operate the physical controls situated on or near the audio mixing console.

Live concert performances, especially those involving significant amplification in large venues, require audio engineers and/or audio technicians (referred to herein generally as "audio engineers") to physically operate an audio mixing console in order to implement, for example, panning, equalization and volume control, and to obtain a quality mix of instruments and vocals in the many locations throughout the performance venue.

FIG. 1 illustrates an example live concert performance that utilizes a prior art audio mixing console. As shown in FIG. 1, music band 100 plays instruments that are amplified. An audio engineer 102 uses audio mixing console 104 to achieve a quality mix of the instruments comprising music band 100.

Audio effects that are controlled by the mixing console 104 comprise, inter alia, volume control 106, panning control 108, equalizer control 110, and bus volume controls 112.

Obtaining a quality mix using prior art mixing consoles 104 can be very time consuming, in part, because the audio engineer 102 must physically adjust the volume control 106, panning controls 108, equalizer 110 and other effects. Moreover, the mixing console 104 is typically situated at a central location within a performance venue, and, therefore, the audio engineer 102 only hears the audio mix of the music band 100 at the mixing console, and cannot hear the results of the mix from other locations within the performance venue. Accordingly, audio engineers 102 rely on feedback from other audio engineers who report on the quality of the mix from various locations within the performance venue. This problem is exacerbated by very large performance venues.

Since audio engineers 102 typically operate mixing consoles 104 at a central location where the audio mixing console 104 is located, many areas, especially those in a very large performance venue, for example, a sports stadium complex, may suffer from a low quality mix because the audio engineer 102 operating the mixing console 104 is not fully informed of the quality of the mix in those areas.

Therefore, the time required to produce a quality mix remains significant because of prior art mixing consoles 104. Furthermore, some venues, especially large ones with many thousands of seats, maintain areas which suffer from a poor quality mix throughout a live concert performance.

SUMMARY OF THE INVENTION

The present invention solves the above-identified problems associated with prior art mixing consoles 104, especially with regard to mixing consoles used for live, amplified performances in large performance venues. Specifically, the present invention preferably employs hardware and software systems to receive information from devices that implement audio effects. The present invention uses network addressable digital potentiometers that implement one or more audio effects, including volume, pan, busing, and equalization, over a communication network.

Preferably, a hypertext transfer protocol ("HTTP") session via the Transmission Control Protocol/Internet Protocol ("TCP/IP") connection is used to send and receive data from the plurality of devices described herein. Moreover, the present invention employs software applications that issue commands to the addressable switches and potentiometers to effect remote control over the mixing console 104.

In order to implement the above-identified solutions to prior art mixing consoles, the present invention preferably comprises a mixing console having at least volume, panning and equalization controls. Moreover, a series of digital potentiometers corresponding to the volume, busing, panning and equalization controls are used to implement a desired audio effect. A network connecting device is installed in the audio mixing console that enables remote communications between the audio mixing console and at least one portable communication device. The portable communication device issues commands over a communication network to actuate the controls on the audio mixing console remotely.

BRIEF DESCRIPTION OF THE DRAWINGS

For the purposes of illustrating the invention, there is shown in the drawings a form which is presently preferred, it being understood, however, that the invention is not limited to the precise arrangements and instrumentalities shown. The features and advantages of the present invention will become apparent from the following description of the invention that refers to the accompanying drawings, in which.

DETAILED DESCRIPTION OF EMBODIMENTS OF THE INVENTION

The present invention integrates analog and digital electronic components in a remote controlled audio mixing console that enables the mixing console to transmit and receive information over a global communication network, such as the Internet. The mixing console preferably functions as a HTTP server and transmits documents formatted in the hypertext markup language ("HTML") to be received by a portable receiving device operating Internet web browser client software, such as MICROSOFT INTERNET EXPLORER and NETSCAPE NAVIGATOR.

Figure 1:
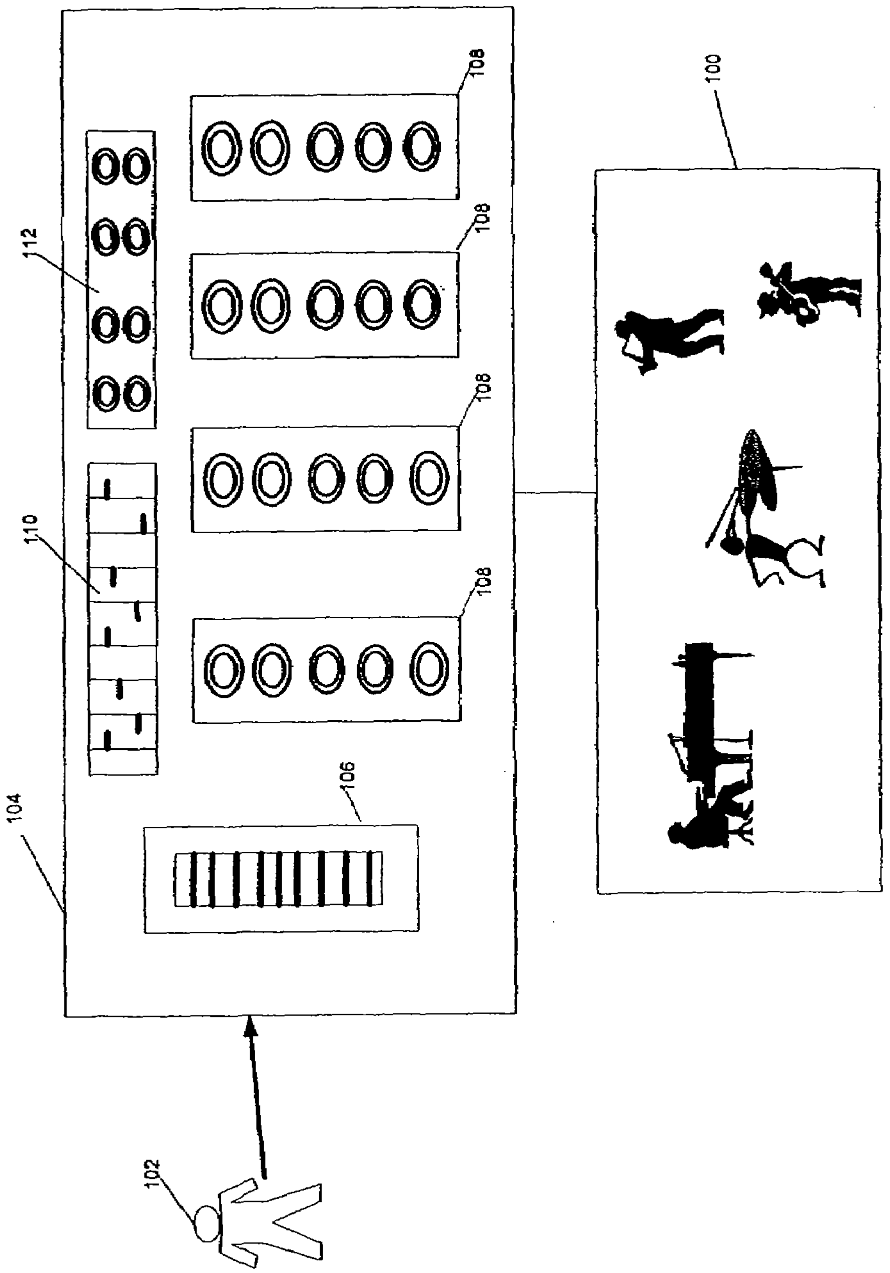
PRIOR ART FIG. 1
FIG. 1 illustrates a live concert performance and utilizing a prior art mixing console 104.
Figure 2:
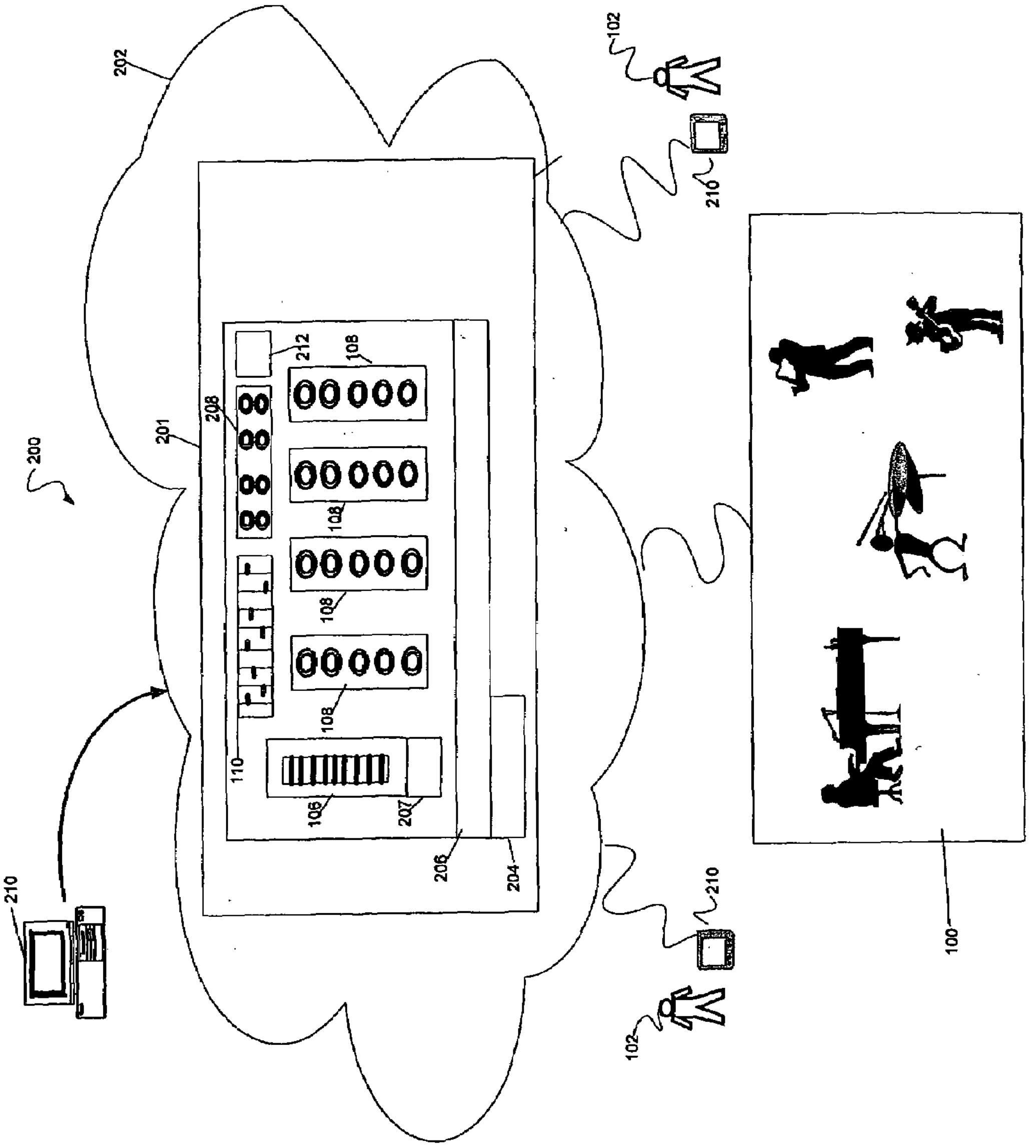
FIG. 2 illustrates a live concert performance and utilizing a remote controlled audio mixing console system 200 in accordance with the present invention.

FIG. 2 illustrates a live concert performance that utilizes the features of the present invention, and is referred to herein, generally as remote controlled audio mixing console system 200. Unlike the prior art audio mixing console 104 shown in FIG. 1, the remote controlled audio mixing console system 200 is adapted to access a communication network 202 and communicate with a plurality of remote devices that also access the communication network 202. In a preferred embodiment, audio engineers 102 access the remote audio mixing console unit 201 via portable communicating devices 210. Portable communicating device 210 is, for example, a personal digital assistant (PDA) operating the PALM OS or the POCKET PC operating system. The portable communicating device 210 preferably uses communication network and web browser software programs to communicate with a HTTP server via a HTTP session. The portable device 210 preferably controls the audio mixing console unit 201 over the communication network 202.

In a preferred embodiment of the present invention, the remote controlled audio mixing console system 200 comprises a network connecting device 204, a receiving socket device 206, for example, a circuit board capable of physically receiving the network connecting device 204, and a plurality of addressable digital potentiometers 208 and switches 212, in addition to many conventional small circuit components. Using at least these components, the remote controlled audio mixing console system 200 is capable of transmitting, receiving and effecting audio effect commands remotely over a standard TCP/IP connection and using a standard HTTP session between an audio engineer 102 and the remote control audio mixing console 201.

In accordance with a preferred embodiment of the present invention, each device operating in the remote controlled audio mixing console system 200 is assigned a unique identifier. For example, the addressable digital potentiometers 208 and addressable switches 212 are each assigned a unique code that identifies them over the communication network. In a preferred embodiment of the present invention, only the network connection device 204, referred to generally herein as the "master" device, operates to issue commands to all of the other devices. The other devices, referred to herein as "slave devices," receive commands from the master device that are communicated over communication network 202. After a master device addresses a slave device, via the slave's unique identifier, only that desired slave device responds to read and write commands issued by the master device.

Figure 3:
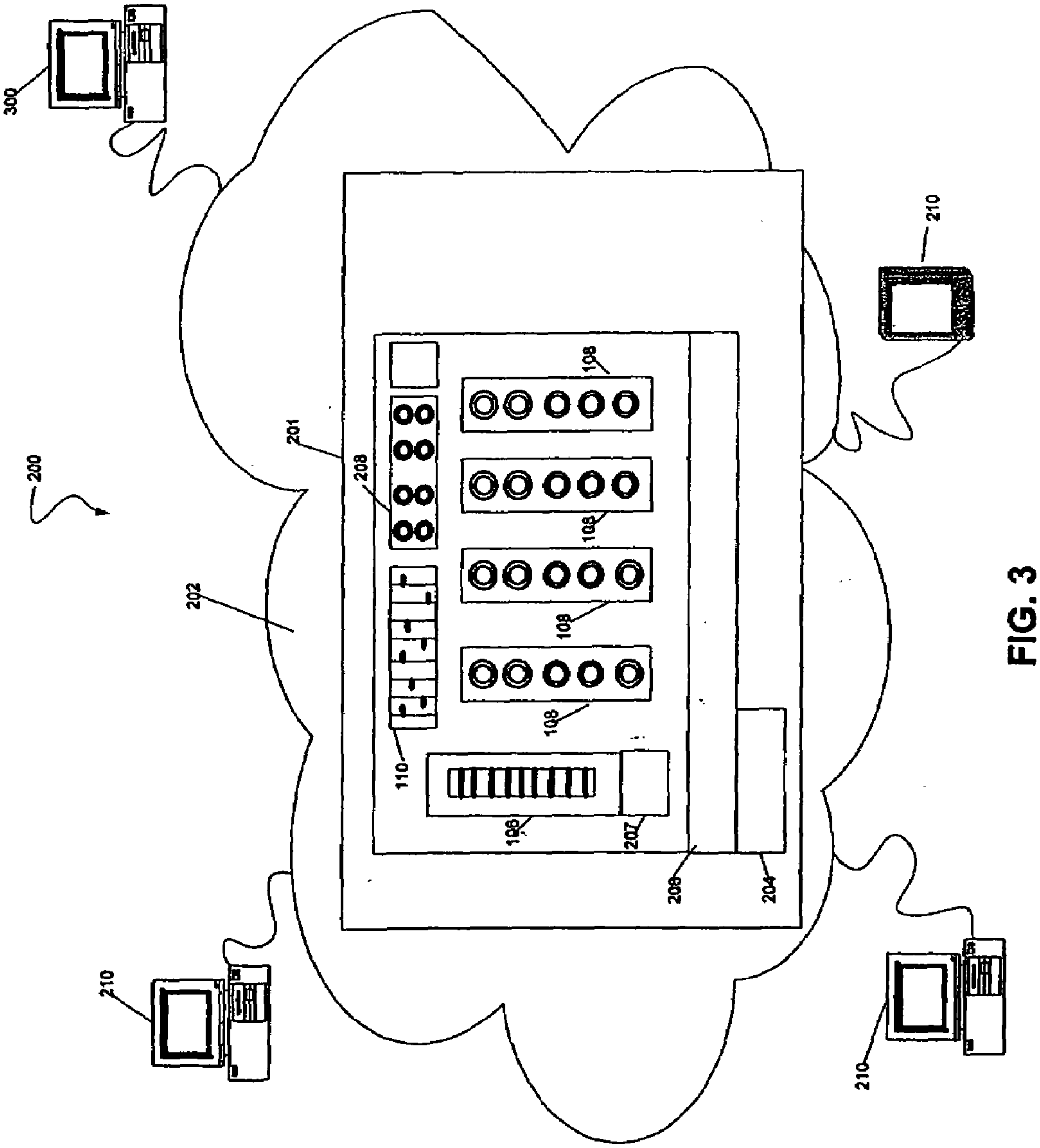
FIG. 3 shows a block diagram of components used in accordance with the present invention.

FIG. 3 shows a block diagram of components required for setting up and using a remote controlled audio mixing console system 200 in accordance with the present invention. As shown in FIG. 3, computer system 300 interfaces with the remote controlled audio mixing console system 200 via the receiving socket device 206. Computer system 300 is a typical device, such as a personal computer, suitable for configuring the remote controlled audio mixing console system 200. Computer system 300 typically operates MICROSOFT'S WINDOWS 2000, UNIX, LINUX, MAC OS or other operating system suitable for personal computers.

During set up and installation of the remote controlled audio system 200, a user of computer system 300 preferably selects one or more software control programs designed for operating the remote controlled audio mixing console system 200, and, thereafter, transmits the control programs to the remote controlled audio mixing console system 200. The control programs can be written in any language suitable for programming, such as JAVA or C++. Preferably, the user of computer system 300 accesses the network connecting device 204 via a telnet session, and, thereafter, transmits the software control program(s) to the remote controlled audio mixing console system 200, for example, via a standard file transfer protocol ("FTP"). After the one or more software control programs have been successfully transmitted to the remote controlled audio mixing console system 200, in accordance with the present invention, an audio engineer is able to remotely control the audio mixing console 201 via a HTTP session over a standard TCP/IP connection.

Figure 4A:
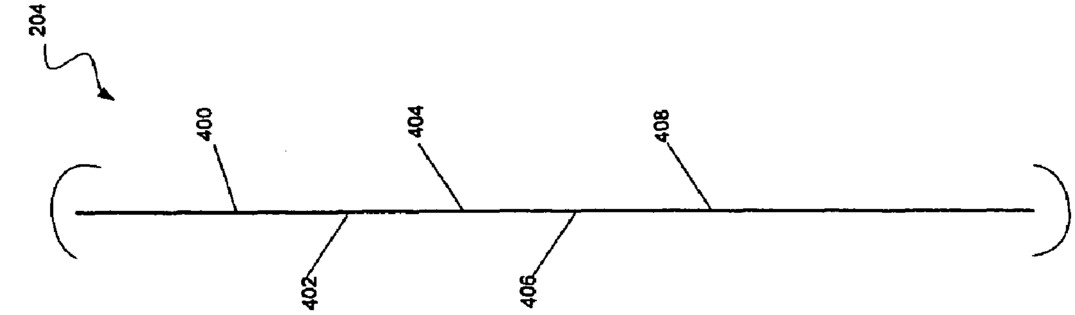
FIG. 4A is a block diagram of the functional elements of an network connecting device used in accordance with the present invention.

As identified in FIG. 4A, the functional elements comprising the network connecting device 204 are illustrated. In a preferred embodiment, network connecting device 204 preferably includes a micro-controller 400, serial communications device 402, memory 404, network device 406 and light emitting diode (LED) 408. The functional elements comprising network connecting device 204 operate to enable communications via communication network 202 between the respective devices of the remote controlled audio mixing console system 200.

The micro-controller 400 is capable of functioning as a master device, and, as such, issues commands to the slave devices in order to implement the audio effects desired by the audio engineer 102. Serial communications device 402 generally functions as a serial port, and is used for communicating over the communication network 202. Memory 404 is an area of storage, typically comprising random access memory ("RAM"), and as such, stores the operating system, software control programs, network communication software and other necessary software, for example, the JAVA VIRTUAL MACHINE ("JVM") that enables operation of JAVA programs via the network connecting device 204. Network controller 406 is used to transmit and receive data to and from other devices across the communication network 202. LED 408 is preferably a series of standard status indicators for, for example, power, network controller and real-time clock.

Figure 4B:
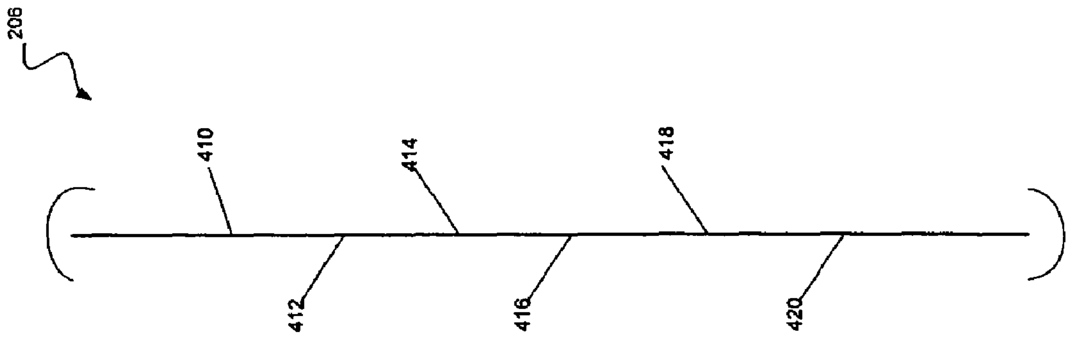
FIG. 4B illustrates a block diagram of the functional elements of a socket board capable of receiving the network connecting device used in accordance with the present invention.

FIG. 4B shows the functional elements of the receiving socket device 206. The receiving socket device 206 is preferably a circuit board capable of receiving the network connecting device 204, and is further capable of interfacing with digital potentiometers 208 to implement audio effects desired by the audio engineer 102. As shown in FIG. 4B, the receiving socket device 206 comprises a power supply 410, wiring 412 and communication port 420. Wiring 412 includes wiring for the components comprising the network connecting device 204. Communication port 420 interfaces with external devices, and can include a standard 9 pin connector, RJ11 port, RJ45 port, or other communication connector.

Figure 5A:
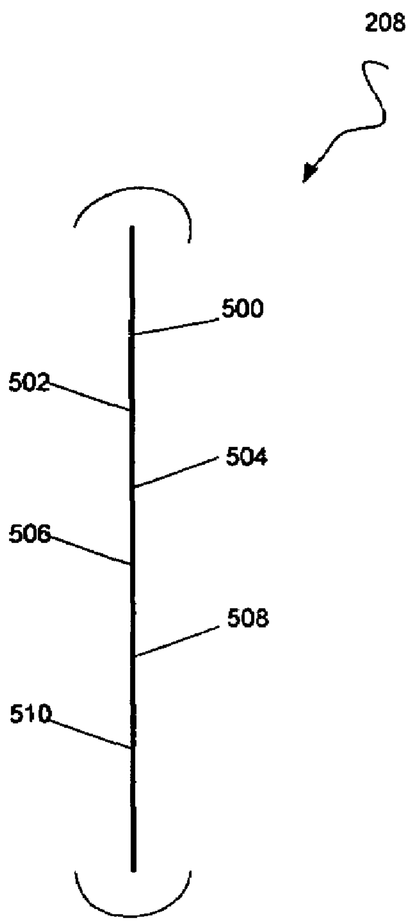
FIG. 5A depicts a block diagram of the functional elements of a potentiometer used in accordance with the present invention.

FIG. 5A illustrates the functional elements of a digital potentiometer 208 used to implement desired audio effects via the present invention. As shown in FIG. 5A, the digital potentiometer 208 comprises six pins. The six pins are used for, for example, power/data 500, power level control 502, a resistor low end 504, a resistor high end 506, a resistor wiper 508 and a ground 510. The data pin is connected to the communications network (wiring 412). The power pin is preferably connected, via a pull-up resistor, to a 5. Volt line. The high end, wiper, and low end of the resistor are the terminals used in wiring the potentiometer into the audio circuit. The wiper is connected to the output, the high end is connected to the op-amp, and the low end is connected to ground, so that when the wiper is positioned all the way towards the high end, there is no attenuation. Alternatively, when the wiper is connected to the low end, there is no signal.

Figure 5B:
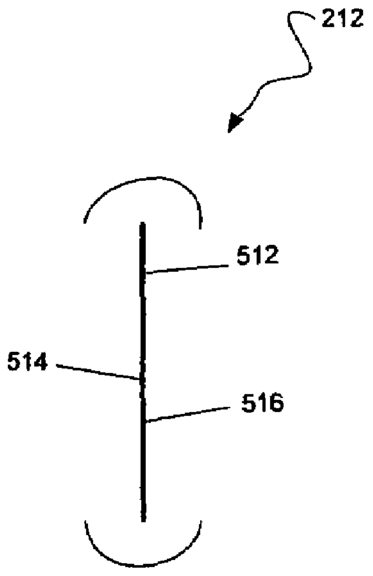
FIG. 5B is a block diagram of the functional elements of an addressable switch used in accordance with the present invention.

FIG. 5B shows the functional elements of the addressable switching device 212. As shown in FIG. 5B, the addressable switching device 212 comprises high/input 512, data and power 514, and low/output 516.

Figure 6A:
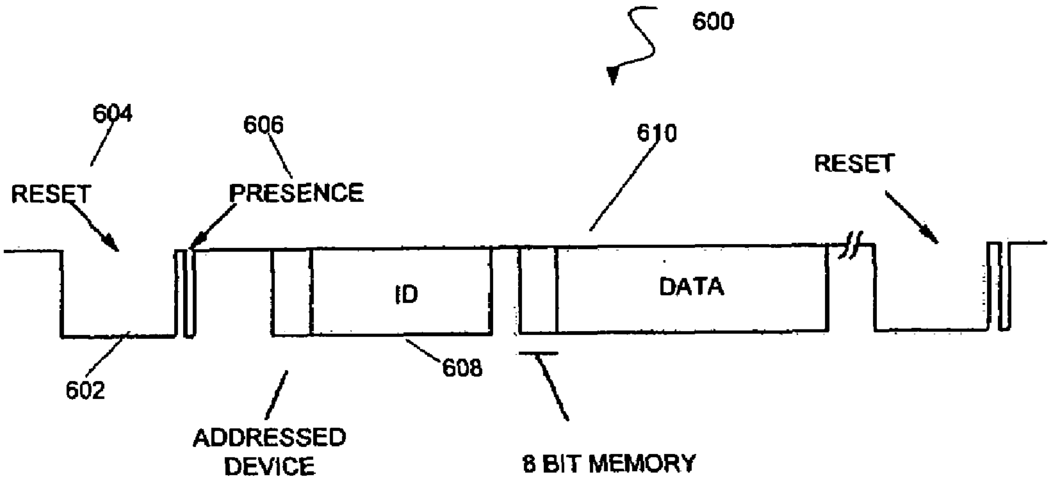
FIG. 6A shows a sample sequence comprising a typical ONE-WIRE communication session.

FIG. 6A shows a sample communication sequence 600 occurring between the respective devices operating within the remote controlled audio mixing console system 200. As shown in FIG. 6A, an illustration of the reception and transmission of information is displayed. In a preferred embodiment of the invention, the devices communicating in the remote controlled audio mixing console system 200 use DALLAS SEMICONDUCTOR ONE-WIRE networking components. The communication sequence is typical of a DALLAS SEMICONDUCTOR ONE-WIRE communication session.

As shown in FIG. 6A, a reset sequence 602, comprising a reset pulse 604 and presence pulse 606, is sent for a message to be transmitted. Following the reset signal 602, a device id command 608 is transmitted prior to a unique device id for addressing a particular device over communication network 202. Thereafter and during the communication sequence 600, a read/write data transmission command 610 is sent prior to the desired data being transmitted or received by the communicating device. Thereafter, another reset sequence 602 is transmitted to initialize transmission of the next message.

As noted above, the present invention preferably utilizes DALLAS SEMICONDUCTOR ONE WIRE components to implement the remote control functionality of the present invention. In a preferred embodiment of the present invention, some of the devices in the remote controlled audio mixing console system 200 are wired using three pins of a standard RJ-11 connector. One pin provides a 5-volt line, one pin provides parasite power and data, and one pin represents a ground. Devices utilizing such components receive power from a pull-up resistor to a 5-volt DC power source, or, alternatively, parasite power can be taken from the data line. The LEDs 408 and switches preferably operate via the 5-volt line and a pull-up resistor, and the digital potentiometers 208 preferably operated using parasite power.

Figure 6B:
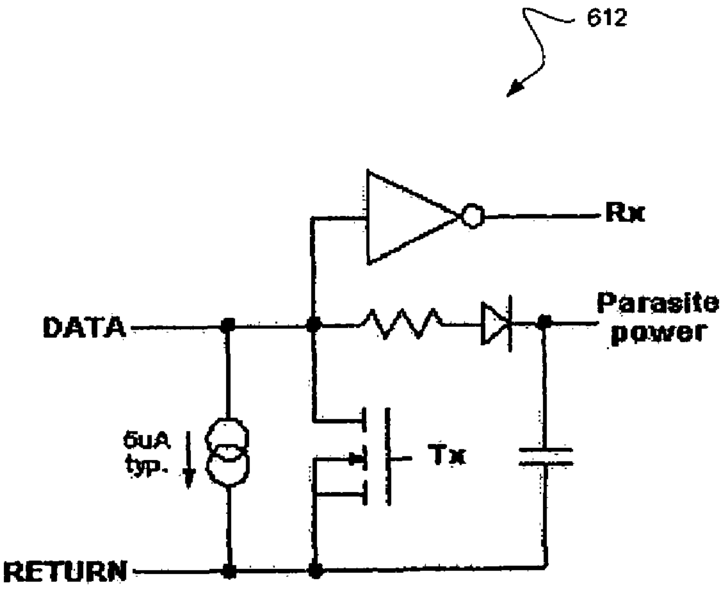
FIG. 6B illustrates a half-wave rectifier circuit providing transmission, reception, and power.

FIG. 6B illustrates a half-wave rectifier circuit 612 that provides data transmission, data reception, and power. When the data line is pulled high by the bus pull-up resistor, the diode in the half-wave rectifier turns on and charges an internal 800 pF capacitor. When the data line drops below the voltage on the capacitor, the diode is reverse-biased, isolating the charge. The isolated charge stored on the capacitor provides an energy source to power a slave device during intervals when the bus is pulled low. The amount of charge lost during these periods is proportional to the time the bus is low, and is replenished when the data line again turns on the half-wave rectifier diode. This concept of "stealing" power from the data line by a half-wave rectifier is referred to herein, generally, as "parasite power."

Figure 7:
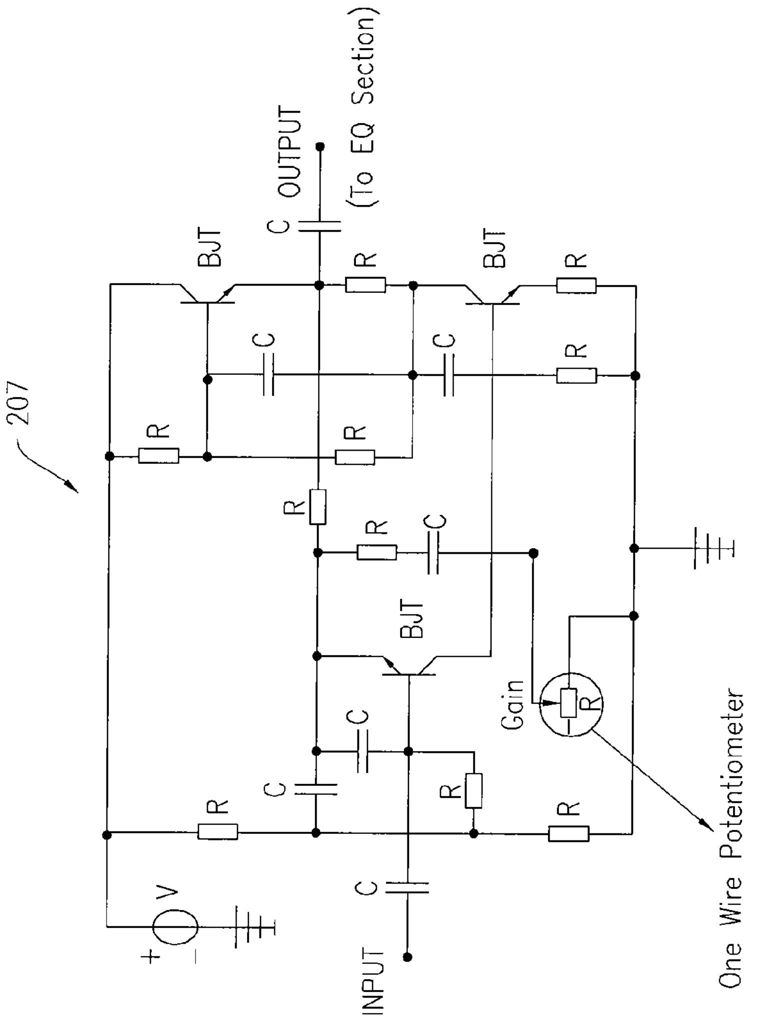
FIG. 7 is a circuit diagram of a pre-amplifier used in a mixing console in accordance with an embodiment of the present invention.

FIG. 7 shows a circuit diagram of a pre-amplifier 207 used in a remote controlled audio mixing console unit 201 in accordance with an embodiment of the present invention. As shown in FIG. 7, a DALLAS SEMICONDUCTOR ONE-WIRE digital potentiometer 208 is employed in the pre-amplifier 207 in order to implement desired audio volume levels (referred to as GAIN in FIG. 7). As shown in FIG. 7, an input is received, passed to the digital potentiometer and then outputted to the next section, for example, an equalizer.

Figure 8:
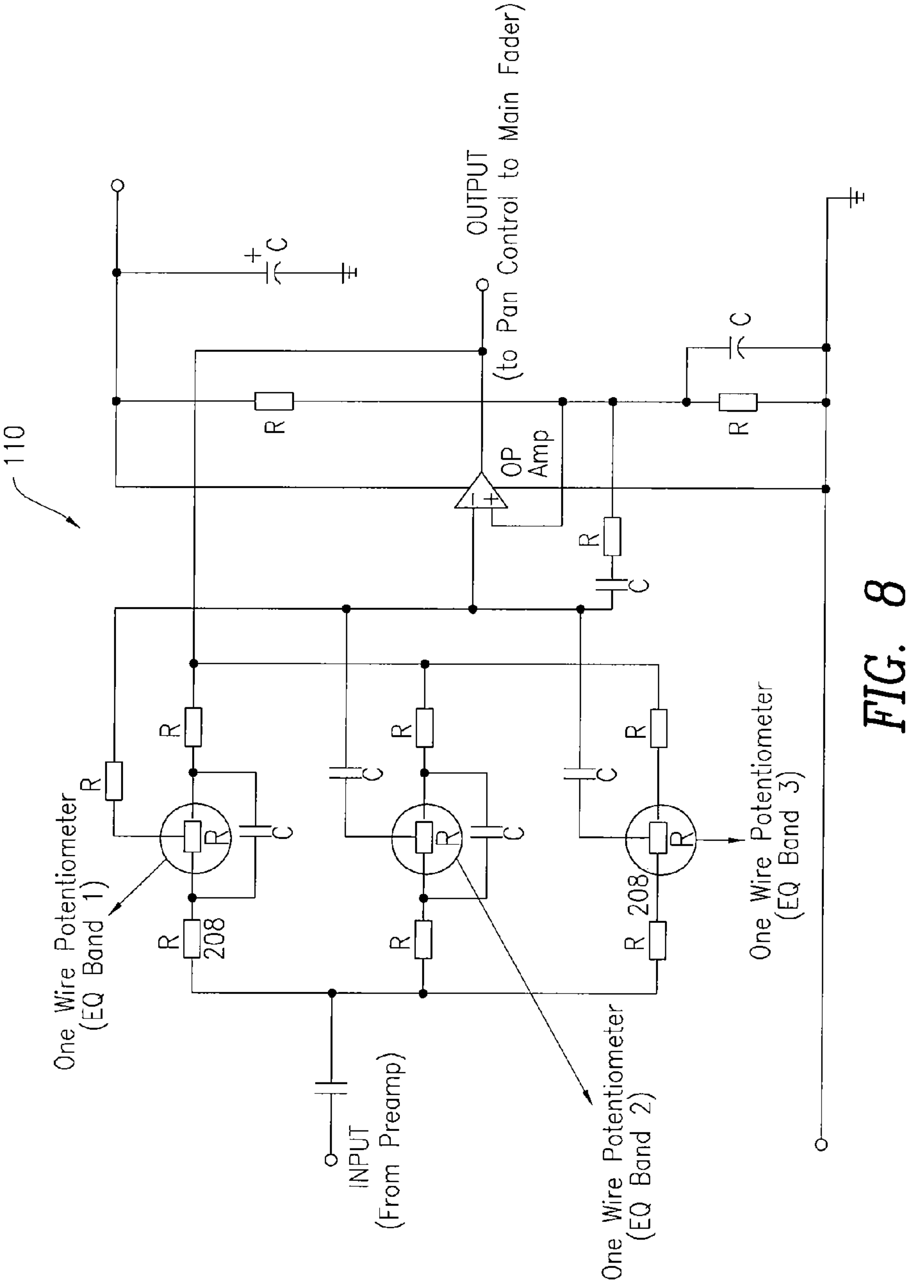
FIG. 8 shows a circuit diagram of a three-band equalizer used in a mixing console in accordance with an embodiment of the present invention.

FIG. 8 shows a circuit diagram of a three-band equalizer 110 used in a remote controlled audio mixing console unit 201 in accordance with an embodiment of the present invention. As shown in FIG. 8, input is received from the pre-amplifier (FIG. 7) and the signal is passed through one of three digital potentiometers 208 shown in FIG. 8. The digital potentiometers 208, shown in FIG. 8, are used to adjust the low-frequency, mid-range frequency and high frequency of an audio signal. Thereafter, the signal is then output to the next section, for example, bus/volume control.

Although the 3 band equalizer 110 shown in FIG. 8 is a passive equalizer, i.e., it contains no amplification, the invention is not so limited. It is contemplated that an active equalizer would be equally useful, or in some cases, preferable to a passive equalizer.

Figure 8A:
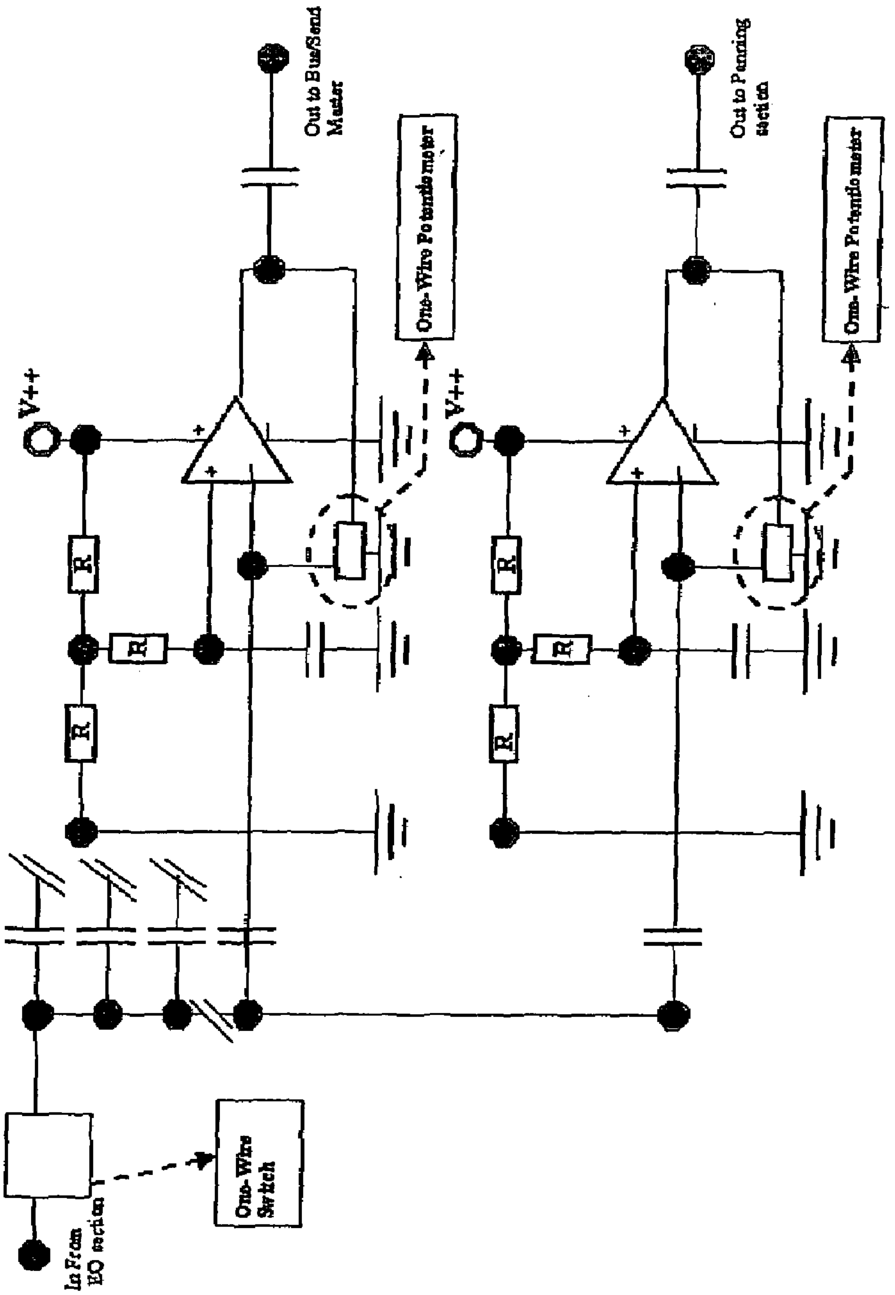
FIG. 8A shows a circuit diagram of an adjustable switch that enables or disables an audio signal from passing.

As shown in FIG. 8A, a signal is received from the three band equalizer 110 (FIG. 8) and passed through a switch 212. If the switch is set to an off position, the audio is muted and no signal flows. If the switch is on, the audio is not muted and signal flows on to at least one of a plurality of digital potentiometers 208 for volume control to various bus outputs, including the main bus. In the example shown in FIG. 8A, the switch 212 is used to prevent or permit the audio signal to pass from the three band equalizer 110 to at least one of the plurality of digital potentiometers 208. In an alternative embodiment of the present invention, the switch 212 is installed on the network connecting device 204 and used to prevent or permit the flow of the data and power signals to any number of devices installed in the remote controlled audio console system 200. For example, by interrupting the flow of the power and/or data to all of the devices installed in the system 200, then collateral noise caused can be significantly reduced or completely eliminated. Therefore, the switch 212 is not limited to an exclusive use with audio signals, but can interrupt other signals passing between the devices in the remote controlled audio mixing console system 200.

Figure 9:
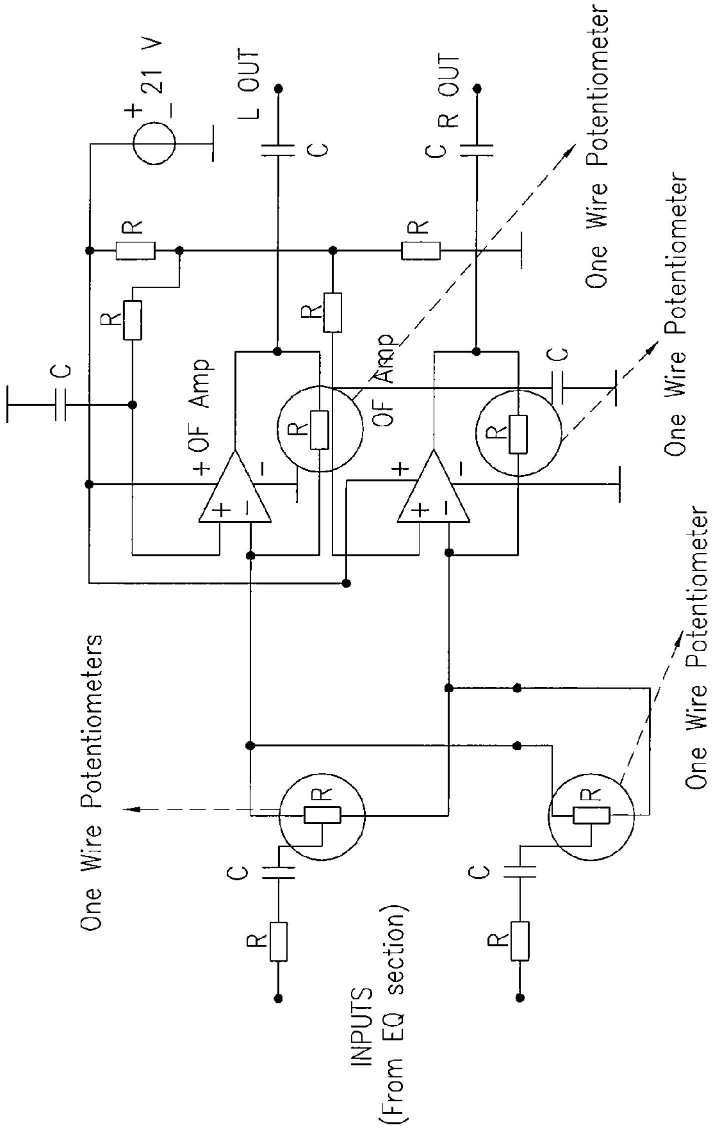
FIG. 9 illustrates a circuit diagram of a pan control and main fader used in a mixing console in accordance with an embodiment of the present invention.

FIG. 9 shows a circuit diagram of a pan control and main fader used in a remote controlled audio mixing console unit 201 in accordance with an embodiment of the present invention. As shown in FIG. 9, signal is received from the volume control section (FIG. 8B) and passed to at least one of a plurality of digital potentiometers 208 for effecting pan control and fader control audio effects. As shown in FIG. 9, the signal that is manipulated by the main fader and pan controls is used to adjust the output from the left channel, the right channel, or both channels (main fader).

Figure 10:
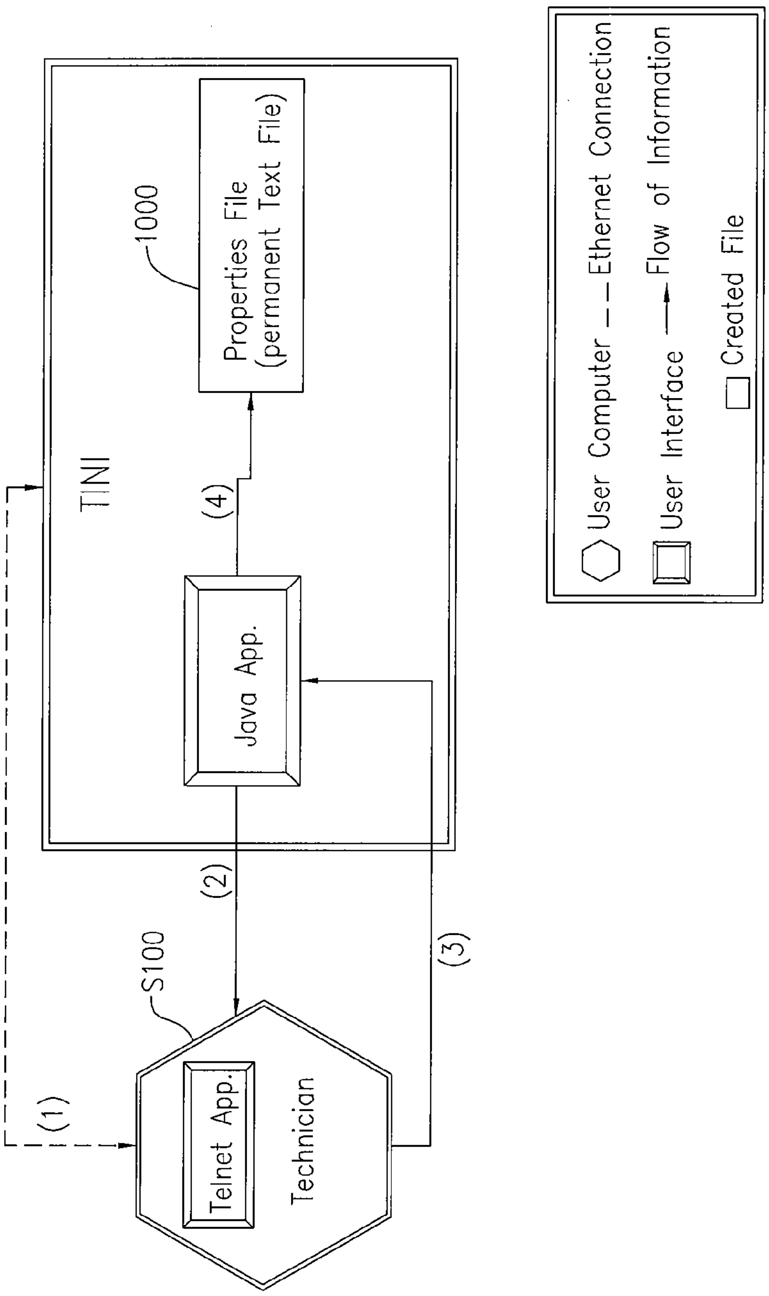
FIG. 10 is a block diagram illustrating steps associated with the setup and installation of a communication interface in accordance with the present invention.

FIG. 10 is a block diagram that illustrates processes associated with an initial set up of the remote audio mixing console system 200 in accordance with a preferred embodiment of the present invention. As shown in FIG. 10, a telnet connection is started and used by a user of computer system 300 (FIG. 3) (step S100). A JAVA software control program is transmitted, preferably via FTP, to the network connecting device 204 (step S102). The JAVA program, for example, an Applet, preferably prompts the user of computer system 300 to enter information, for example, the unique identifier of devices comprising the remote controlled audio mixing console system 200. The information is preferably saved for future operations of the remote controlled audio mixing console system 200, for example, in a properties text file 1000.

As noted above with regard to FIG. 4, network connecting device 204 preferably comprises memory 404 which stores software control programs for operating the remote audio mixing console system 200. The operating system software preferably includes control programs to enable the network connecting device 204 to function as a HTTP server over a standard TCP/IP network connection. Moreover, the operating system software also preferably comprises the JVM to enable operation of JAVA software programs, for example JAVA applications and JAVA APPLETS.

In a preferred embodiment of the present invention, the operating system software driving the network connecting device 204 also includes a software control program that provides server-side processing, for example, a JAVA SERVLET software program ("SERVLET"). SERVLETS are adapted to dynamically generate HTML and transfer the HTML over a standard HTTP session to be interpreted by Internet web browser client software. Other capabilities of SERVLETS include receiving information transmitted from a JAVA APPLET, processing the information in accordance with software control programs executing on a server system and generating HTML that reflects results of the information processing.

As used herein, a software control program that effects server-side processing of information directed to controlling the devices in the remote controlled audio mixing console system 200 is referred to, generally, as a server program. A server, as used herein, a server program can be any software program or tool for processing information on the network connecting to the 204, including, for example, SERVLETS, scripting tools (e.g., see CGI, pearl and the like).

Figure 11A:
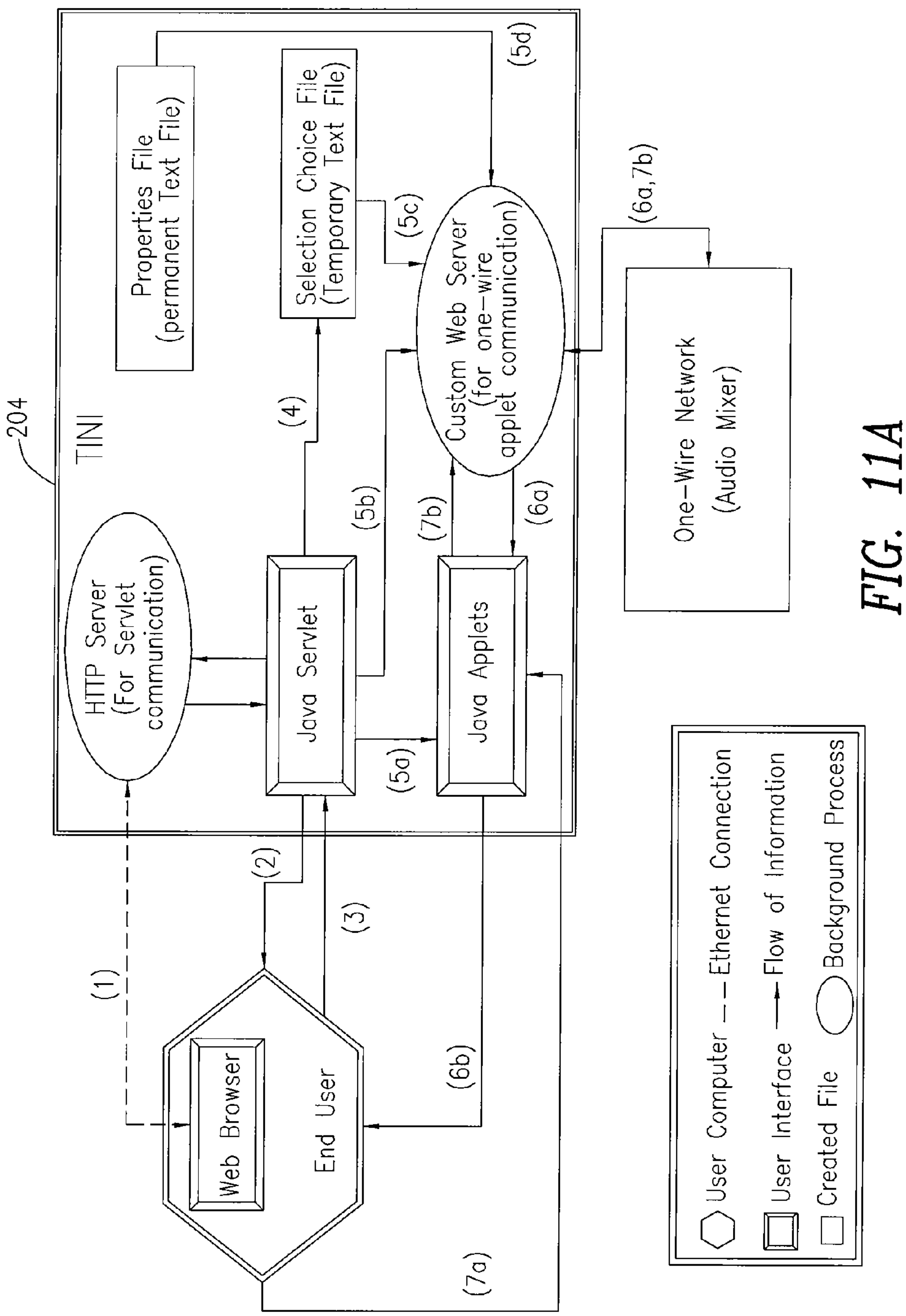
FIG. 11A is a block diagram showing the components used during a remote audio mixing session in accordance with the present invention.

FIG. 11A is a block diagram showing the components used during operation of the remote audio mixing console system 200. As shown in FIG. 11A, an audio engineer 102 operating a portable communicating device 210 establishes a HTTP session with the network connecting device 204. The network connecting device 204, functioning as a HTTP server and also a server program receives a request from the portable communicating device 210. The network communicating device 204 preferably generates HTML that is transmitted to, and received by, the portable communicating device 210. Moreover, one or more JAVA APPLETS are transmitted to and received by the portable communicating device 210. In a preferred embodiment of the present invention, the audio engineer 102 via the portable communicating device 210 responds to a series of prompts, for example, graphic controls including, for example sliders, check boxes and other graphic representations of remote audio mixing console 201, and the responses are transmitted to and received by the network connecting device 204. The selections made by the audio engineer 102 are preferably stored in a selection choice file 1100 and used in conjunction with the properties file 1000 (FIG. 10) by the network connecting device 204 in order to implement the audio effect desired by the audio engineer 102. Preferably, the selection choice file 1100 is used with the properties file 1000 by the network connecting device 204 to effect an addressable switching device 212 or an addressable digital potentiometer 208 within the remote controlled audio mixing console system 200. Through the use of server programs and APPLETS, an audio engineer 102 is able to use a portable communicating device 210 to implement one or more desired audio effects and produce a quality audio mix, for example, in a large performance venue.

Figure 11B:
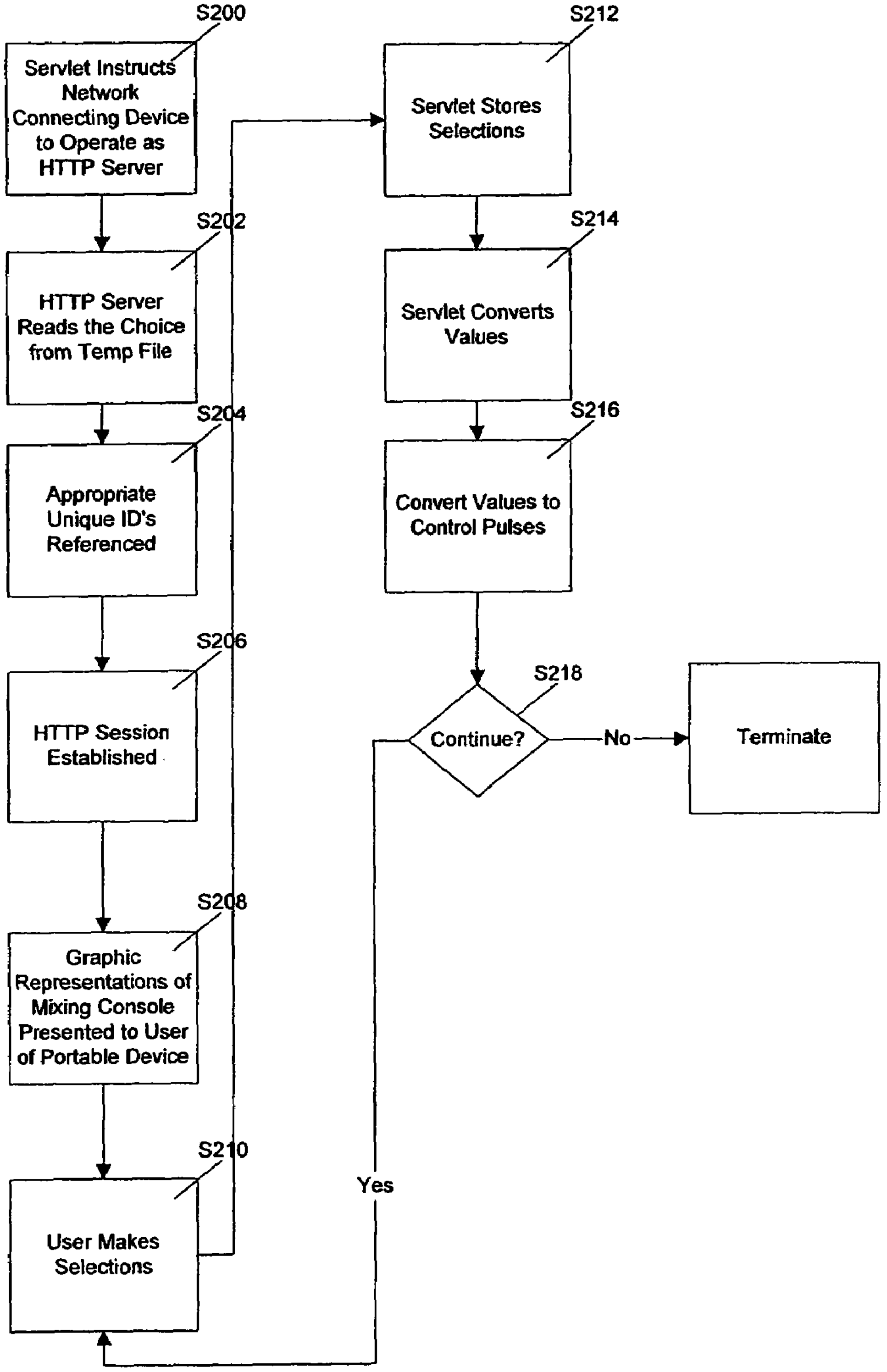
FIG. 11B is a flow chart of the steps associated with a remote audio mixer communication session in accordance with the present invention.

FIG. 11B is a flow chart that illustrates the steps associated with the present invention.

At the beginning of the process, in step S200, a server program is operated that instructs the network connecting device 204 to operate as a HTTP server. Thereafter, the HTTP server references the properties file 1000 that identifies the unique identifiers of the devices operating on the remote controlled audio mixing console system 200 (step S202). Thereafter, the network connecting device 204 reads the appropriate identifiers from the properties file 1000 and uses the unique identifiers in an APPLET to be transmitted to the portable communicating device 210 operated by the audio engineer 102 in order to implement audio effects desired by the audio engineer 102. The APPLET comprises a series of graphic controls that simulate the physical controls of the remote control audio mixing console 201, for example, switches, sliders, and buttons. In step S206, an HTTP connection is established between the portable communicating device 210 and the network connecting device 204. Thereafter, in step 208, choices are presented to the audio engineer 102 on his portable communication device 210 that enable control over the remote audio mixing console 201, for example, panning, volume control, and equalization.

In step S210, the audio engineer 102 makes adjustments via the portable communication device 210 that indicate the desired adjustments to the remote control audio mixing consoles 201. In step S212, a server program stores the selections made by the audio engineer 102 via the APPLET running on the portable communication device 210.

In step S214, the server program processes the information received from the APPLET and stores the information in the selection choice file 1100.

In step S214, the server program converts the values received from the portable communicating device 210 and, in step S216, converts the values into control pulses to be transmitted to the respective device that corresponds to the unique identifier selected by the audio engineer 102 via the portable communicating device 210. This process repeats in step S218 until the audio engineer 102 is satisfied with the quality of the mix, and terminates by control of the audio engineer 102 operating the portable communicating device 210.

Since the present invention preferably utilizes HTTP connections, and the network connecting device 204 operates as a HTTP server, a plurality of sessions (or threads) can operate essentially simultaneously to enable a plurality of audio engineers 102 to cause the remote controlled audio mixing console 201 to function to generate a quality mix. For example, each audio engineer 102 directs the web browser's software programs operating on his respective portable communicating device 210 to point to the IP address of the network connecting device 204. The server program transmits an APPLET that offers choices of adjusting individual controls on the remote controlled audio mixing consoles 201 and the SERVLET operating on the network communicating device 204 controls the respective devices. In this way, a quality mix can be generated in a substantially reduced amount of time compared to prior art audio mixing consoles 104 since a plurality of audio engineers 102 can implement audio effects simultaneously.

Although the present invention has been described in relation to particular embodiments thereof, many other variations and modifications and other uses will become apparent to those skilled in the art. Therefore, the present invention is not limited by the specific disclosure.

What is claimed is:

1. A system for mixing analog audio signals via remote control command signals sent over a communication network, said system comprising:

a mixing console that processes analog audio signals, said mixing console comprising at least one of a volume control, a panning control and an equalization control;

a plurality of digitally-controlled potentiometers enabling said mixing console to implement at least one audio effect, each of said plurality of digitally-controlled potentiometers corresponds to at least one of said volume control, panning control and equalization control;

a network connecting device, said network connecting device enabling communication of said mixing console over said communication network; and at least one handheld portable communication device, wherein said at least one handheld portable communication device issues a command to said network connecting device to actuate at least one of said volume control, said panning control and said equalization control to implement said at least one audio effect.

2. The system of claim 1, wherein said network connecting device comprises at least one of:

a micro-controller module, said micro-controller module issues a command to at least one of said plurality of digitally-controlled potentiometers to enable said audio effect;

a communications module, said communications module provides an interface for external devices;

a memory storage, said memory storage storing at least one of an operating system and a network communication software module;

a network module, said network module transmits and receives information between devices over said communication network; and an indicator module, said indicator module indicating at least one of power and network communication.

3. The system of claim 2, further comprising a receiving socket device, said receiving socket device receives said network connecting device and interfaces with said plurality of digitally-controlled potentiometers.

4. The system of claim 1, wherein the communication network is the Internet.

5. The system of claim 1, wherein said network connecting device functions as a HTTP server.

6. The system of claim 1, wherein at least one device communicating over said communication network is assigned a unique identifier.

7. The system of claim 1, further comprising:

a first computer program receiving at least one instruction to actuate at least one of said volume control, said panning control and said equalization control to implement said audio effect;

a second computer program receiving said at least one instruction from said first computer program and issuing said instruction to at least one of said respective volume control, said panning control and said equalization control to implement said audio effect.

8. The system of claim 7, wherein said first computer program resides on said handheld portable communication device and said second computer program resides on said network connecting device.

9. The system of claim 1, wherein the communication network is a local area network.

10. A method for remotely actuating controls on an audio mixing console that processes analog audio signals to implement an audio effect, said method comprising:

establishing a TCP/IP connection between said audio mixing console and a handheld portable communication device over a communication network;

transmitting a first computer program from said audio mixing console to said handheld portable communication device, said first computer program providing a graphic representation of said analog audio controls for said audio mixing console for a user of said handheld portable communication device;

transmitting information from said first computer program to a second computer program operating with said audio mixing console to actuate said controls to implement said audio effect; and actuating at least one of volume control, panning control and equalization control on said audio mixing console as a function of said information received from said first computer program.

11. The method of claim 10, further comprising establishing a HTTP session between said audio mixing console and said handheld portable communication device.

12. The method of claim 10, wherein said first computer program is an Applet and said second computer program is a Server.

13. The method of claim 12, wherein said Applet receives input from a user of said handheld portable communication device and transmits said input to said Server.

14. The method of claim 13, wherein said Server receives said input and addresses respective devices comprising said audio mixing console to actuate at least one of said volume control, panning control and equalization control to implement said audio effect.

15. A system for mixing analog audio signals via remote control command signals sent over a communication network, said system comprising:

a mixing console that processes analog audio signals said mixing console comprising at least one of a volume control, a panning control and an equalization control;

a plurality of digitally-controlled potentiometers enabling said mixing console to implement at least one audio effect, each of said plurality of digitally-controlled potentiometers corresponds to at least one of said volume control, panning control and equalization control; and a network connecting device, said network connecting device comprising at least one of:

a micro-controller module, said micro-controller issues commands to at least said plurality of digitally-controlled potentiometers to enable said audio effects;

a communications module, said communications module provides an interface for external devices;

a memory storage, said memory storage storing at least one of an operating system and a network communication module;

a network module, said network module transmits and receives information between devices over said communication network; and an indicator module, said indicator module indicating at least one of power and network communication; and at least one handheld portable communicating device;

wherein said handheld portable communicating device issues commands over said communication network to said network connecting device and said network connecting device directs said at least one digitally-controlled potentiometer to cause said mixing console to implement said at least one audio effect.

* * * * *